United States Patent
Douberley et al.

(10) Patent No.: US 9,912,547 B1
(45) Date of Patent: Mar. 6, 2018

(54) COMPUTER PLATFORM TO COLLECT, MARSHAL, AND NORMALIZE COMMUNICATION NETWORK DATA FOR USE BY A NETWORK OPERATION CENTER (NOC) MANAGEMENT SYSTEM

(71) Applicant: Sprint Communications Company L.P., Overland Park, KS (US)

(72) Inventors: David N. Douberley, Orlando, FL (US); Justin L. Ford, Orlando, FL (US); Matthew D. Kurtz, Altamonte Springs, FL (US); Kevin Murphy, Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 221 days.

(21) Appl. No.: 14/920,873

(22) Filed: Oct. 23, 2015

(51) Int. Cl.
*G06F 15/173* (2006.01)
*H04L 12/24* (2006.01)
*H04L 12/26* (2006.01)
*G06F 11/10* (2006.01)

(52) U.S. Cl.
CPC .......... *H04L 41/12* (2013.01); *G06F 11/1004* (2013.01); *H04L 43/04* (2013.01)

(58) Field of Classification Search
CPC ..................................................... H04L 41/12
See application file for complete search history.

(56) References Cited

U.S. PATENT DOCUMENTS

| | | |
|---|---|---|
| 5,371,883 A | 12/1994 | Gross et al. |
| 9,753,800 B1 | 9/2017 | Jadunandan et al. |
| 2006/0233310 A1 | 10/2006 | Adams et al. |
| 2007/0038676 A1* | 2/2007 | Nagral .................. G06F 9/4443 |
| 2008/0181100 A1 | 7/2008 | Yang et al. |
| 2008/0270997 A1 | 10/2008 | Murray et al. |
| 2009/0170472 A1 | 7/2009 | Chapin et al. |
| 2010/0005341 A1 | 1/2010 | Agarwal et al. |
| 2010/0144367 A1 | 6/2010 | Goh et al. |
| 2011/0140911 A1 | 6/2011 | Pant et al. |
| 2013/0138538 A1* | 5/2013 | Perry ..................... G06Q 10/06 705/28 |
| 2013/0238471 A1* | 9/2013 | Maraz .................. G06Q 10/087 705/28 |
| 2013/0304530 A1* | 11/2013 | Chodavarapu ..... G06Q 10/0639 705/7.11 |

(Continued)

OTHER PUBLICATIONS

Notice of Allowance dated Apr. 24, 2017, U.S. Appl. No. 14/920,874, filed Oct. 23, 2015.

(Continued)

*Primary Examiner* — Michael Won
*Assistant Examiner* — Nicholas Celani (57) ABSTRACT

A communication network operation center (NOC) network inventory data platform. The platform comprises a processor, a non-transitory memory, a data store, and a plurality of applications and logic modules. The logic modules collect data from element management systems associated with network equipment. The applications convert the data to data structures and transcode the data structures in a common data format. The applications store the transcoded data structures in an inventory database. A NOC management application presents a network management view based on the inventory database.

19 Claims, 9 Drawing Sheets

(56) References Cited

U.S. PATENT DOCUMENTS

2014/0325000 A1* 10/2014 Lorch ................. H04M 1/7253
                                                                     709/206
2016/0179598 A1    6/2016 Lvin et al.

OTHER PUBLICATIONS

FAIPP Pre-Interview Communication dated May 4, 2017, U.S. Appl. No. 14/922,103, filed Oct. 23, 2015.
Final Office Action dated Aug. 28, 2017, U.S. Appl. No. 14/922,103, filed Oct. 23, 2015.
Douberley, David N., et al., entitled, "Validating Development Software by Comparing Results From Processing Historic Data Sets," filed Oct. 23, 2015, U.S. Appl. No. 14/922,103.
Gonzalez, Jose A., et al., entitled, "Enhanced Node B (eNB) Backhaul Network Topology Mapping," filed Apr. 26, 2016, U.S. Appl. No. 15/139,293.
Advisory Action dated Nov. 3, 2017, U.S. Appl. No. 14/922,103, filed Oct. 23, 2015.
Notice of Allowance dated Nov. 22, 2017, U.S. Appl. No. 14/922,103, filed Oct. 23, 2015.

* cited by examiner

COMPUTER PLATFORM TO COLLECT, MARSHAL, AND NORMALIZE COMMUNICATION NETWORK DATA FOR USE BY A NETWORK OPERATION CENTER (NOC) MANAGEMENT SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication network may comprise a radio access network (RAN) and a core network. The RAN provides wireless communication links to user equipment (UE) such as mobile phones and wireless enabled portable computers. The core network provides a variety of communication services such as authentication of UEs attempting to connect to the core network via the RAN, mobility management services, and premium communication services. A wireless communication network may comprise a very large number of network elements such as enhanced node Bs (eNBs) or cell towers, routers, servers, and the like. Different network elements may be manufactured by different vendors or original equipment manufacturers (OEMs). The totality of network elements may be referred to as network inventory or inventory. It is desirable for wireless communication service providers to monitor and manage their communication network remotely, for example from a network operations center (NOC) using computer based tools. Such computer based tools may be provided by computer software or applications executing on one or more computers.

SUMMARY

In an embodiment, a communication network operation center network equipment inventory data platform is disclosed. The inventory data platform comprises at least one processor, a non-transitory memory, a data store, a plurality of data collection logic modules stored in the non-transitory memory, a marshalling application stored in the non-transitory memory, a normalization application stored in the non-transitory memory, and a network operations center (NOC) management application stored in the non-transitory memory. When executed by the processor, the plurality of data collection logic modules accesses raw data about network equipment items collected by original equipment manufacturer (OEM) element management systems (EMSs) and stores the raw data in the non-transitory memory. When executed by the processor, the marshalling application calculates a checksum on portions of the raw data about the network equipment items and compares the checksum to a checksum stored in the data store associated with a corresponding portion of normalized data previously stored in the data store. When the checksums match, the marshalling application updates the date stamp associated with the corresponding portion of normalized data previously stored in the data store, converts the raw data about network equipment items stored in the non-transitory memory, excluding the portion of raw data associated with a matching checksum, into a plurality of data structures. Converting the raw data comprises grooming the raw data to remove data content errors, detecting compressed raw data, and uncompressing the compressed raw data. When executed by the processor, the normalization application transcodes the data converted by the marshalling application from a plurality of OEM formats to a common format and stores the transcoded data in the data store as an inventory database. When executed by the processor, the network operations center (NOC) management application presents a network management view of network equipment based on the inventory database.

In an embodiment, a method of managing a communication network from a network operation center (NOC) management application is disclosed. The method comprises collecting files comprising data on communication network equipment items from element management systems (EMSs) of a plurality of original equipment manufacturers (OEMs) of the network equipment items, where the files are collected by logic executing on a computer system; calculating checksums on the files by a marshalling application executing on a computer system; determining by the marshalling application that a checksum on one of the files agrees with a checksum associated with a portion of data associated with the file previously saved in an inventory database; determining by the marshalling application that the a file is compressed; uncompressing by the marshalling application the compressed file; converting the raw data in the files by the marshalling application, including the uncompressed file, exclusive of the file having the matching checksum, into a plurality of data structures, wherein converting comprises determining grooming the raw data to remove and correct data content errors; transcoding the converted data from a plurality of OEM formats to a common format by a normalization application executing on a computer system; storing by the normalization application the transcoded data in an inventory data store; and presenting a view of the communication network based on the inventory data store on a display by a computer system.

In an embodiment, a communication network operation center network (NOC) equipment inventory data platform is disclosed. The inventory data platform comprises at least one processor, a non-transitory memory, a data store, a plurality of data collection logic modules stored in the non-transitory memory, a marshalling application stored in the non-transitory memory, a network topology analysis application stored in the non-transitory memory, and a network operations center (NOC) management application stored in the non-transitory memory. When executed by the processor, the marshalling application calculates a checksum on portions of the raw data about network equipment items and compares the checksum to a checksum stored in the data store associated with a corresponding portion of normalized data previously stored in the data store, converts the raw data about network equipment items stored in the non-transitory memory, excluding the portion of raw data associated with a matching checksum, into a plurality of data structures, wherein converting the raw data comprises grooming the raw data to remove data content errors, detecting compressed raw data, and uncompressing the compressed raw data. When executed by the processor, the network topology analysis application analyzes the converted data about network equipment items to determine physical parent-child relationships and logical parent-child relationships among the network equipment items and stores physical and logical topology relationship information in a network topology database. When executed by the processor, the network operations center (NOC) management application presents a network management view of network equipment based on the network topology database.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method of collecting, converting, and normalizing data from a wireless communication network into a common data format as well as determining both physical and logical parent-child relationships between network elements. Network equipment items in a network may be provided by various vendors and original equipment manufacturers (OEMs). Different vendors and OEMs may use different languages such as extensible markup language (XML) formatting and comma separated value (CSV) formatting in order to communicate with other network equipment items. They may also represent performance differently; for example, different vendors and OEMs may use different units. A provider may want to collect data from the network and gather it into a central system to compare the collected data from the network equipment items. The data would be easier to process if no duplicated data existed and all files were normalized to a common format. For example, a provider may want to track a specific card located in a base band unit (BBU). The card and the BBU each possess a unique serial number, which other network elements may read. By continuously collecting data from the network, the provider would know exactly when the card in the BBU has been moved to a different slot or entirely removed either on purpose or unintentionally.

Another aspect of network equipment items a provider may like to know would be physical parent-child relationships and logical parent-child relationships between network elements. For example, a physical parent-child relationship would be akin to the card in the slot of the BBU. For example, a logical parent-child relationship would be two or more network equipment items sharing common IP subnets or matching IP address configurations. Knowing both physical and logical parent-child relationships would aid in validating errors in a network system.

For example, the system may keep track of a management system in a network. If the managing system is over capacity, and a vendor replaces the management system with a new, different management system, the provider would receive a notification or alert the next time the system compared data with previously stored data, which could be from one minute, one hour, one day, one week, or any other time interval. For example, the system may detect a file or multiple files with a defective data structure or bad characters after running a parse command that has failed. Then, the system would amend the faulty files, and then automatically clean the specific file when the inventory database updates.

The system, at a high level, collects data, processes the raw data, normalizes the raw data, and writes the normalized data from memory to a data store. The system performs this processing at a periodic interval, for example daily. The normalized data in the data store is used by a network operations center (NOC) management application. The system further reads the normalized data from the data store, analyzes the normalized data to infer a topology view of the service provider network, and writes a representation of the topology back into the data store for use by the same NOC management application.

The system uses a plurality scripts or data collection logic modules (e.g., more than 20) that retrieve information about network equipment items from vendor provided element management systems (EMSs), a different script for each different equipment item type. This is the collection step referred to above. It is understood that the data read from the different equipment types may be of different formats and types. The data is arranged in a plurality of files in memory, one file per script.

A marshalling application of the system then compares these files to corresponding files stored in the data store from the previous cycle. If the files are substantively the same (file names and/or date stamps may change), the date and time stamp of the file in the data store is updated to the current time, and no further processing is performed on this particular file. In an embodiment, the comparison is done by calculating a checksum on the current file and comparing this checksum with the checksum calculated on the previous corresponding file stored in the data store. Comparing the files in this way can save on processing time and thereby improves the computer system solution of the problem of refreshing and updating network inventory data and information. For example, if only half of the equipment item types are changed from one cycle to the next (e.g., over one day's time), the number of files to be processed may be halved correspondingly.

Files that are changed may be processed by the marshalling application in a variety of ways including uncompressing files that are received from their associated EMS in compressed form and correcting systematic errors that have previously been identified in the data and/or data files. This processing may be performed by dedicated modules, a different module for each different equipment item type (one for each collection script). The data is structured into database tables. This is the raw data processing step referred to above. A normalization application of the system then transcodes or converts values of data to a uniform and/or standard format to create normalized tables. These normalized tables are then written into the data store. This is the normalization step referred to above.

A network topology analysis application of the system reads the data back out of the data store and analyzes it to infer topological relationships among equipment items. Topological relationships can be physical parent-child relationships or logical parent-child relationships, as described above. Topological relationships can also include co-locational relationships. For example, CDMA equipment and LTE equipment that are installed in independent equipment racks in the same cell site may have a co-locational relationship with each other. The process of inferring these topological relationships can be somewhat convoluted. For example, to determine that CDMA equipment is co-located with LTE equipment may be difficult to determine initially, because the equipment may be provided by different EMSs provided by different vendors and locational information may not be consistent. It may, however, be possible to determine from other relationships that the LTE and CDMA equipment are co-located, for example based on shared service by the same equipment housing monitoring equipment (e.g., "door open" monitoring, temperature monitoring, etc.). Likewise, relationships may be inferred from IP address of a mobility management entity (MME) equipment item and a reference to this IP address in a eNB—therefore implying that the eNB is a logical child of the subject MME.

The process of the system creating the normalized data and the topology in the data store periodically from authoritative information sources provides the advantage of refreshed and accurate information. It is well known that in large complex wireless communication networks equipment configurations are either erroneously documented initially or change over time. For example, cards are removed from one rack slot and moved—to another rack slot, to another rack, or to an entirely different cell site—without updating the configuration records and/or data. This system provides the advantage of providing accurate network inventory information up-to-date within the time interval of the repeat cycle, in some embodiments current within a day's time.

The solution provided by the system described above is inherently provided by a computer system. A typical wireless communication service provider network comprises tens of thousands of cell sites having many separate independent components. A human being cannot timely interact with this many equipment items without the intervention of a computer system.

Figure 1:
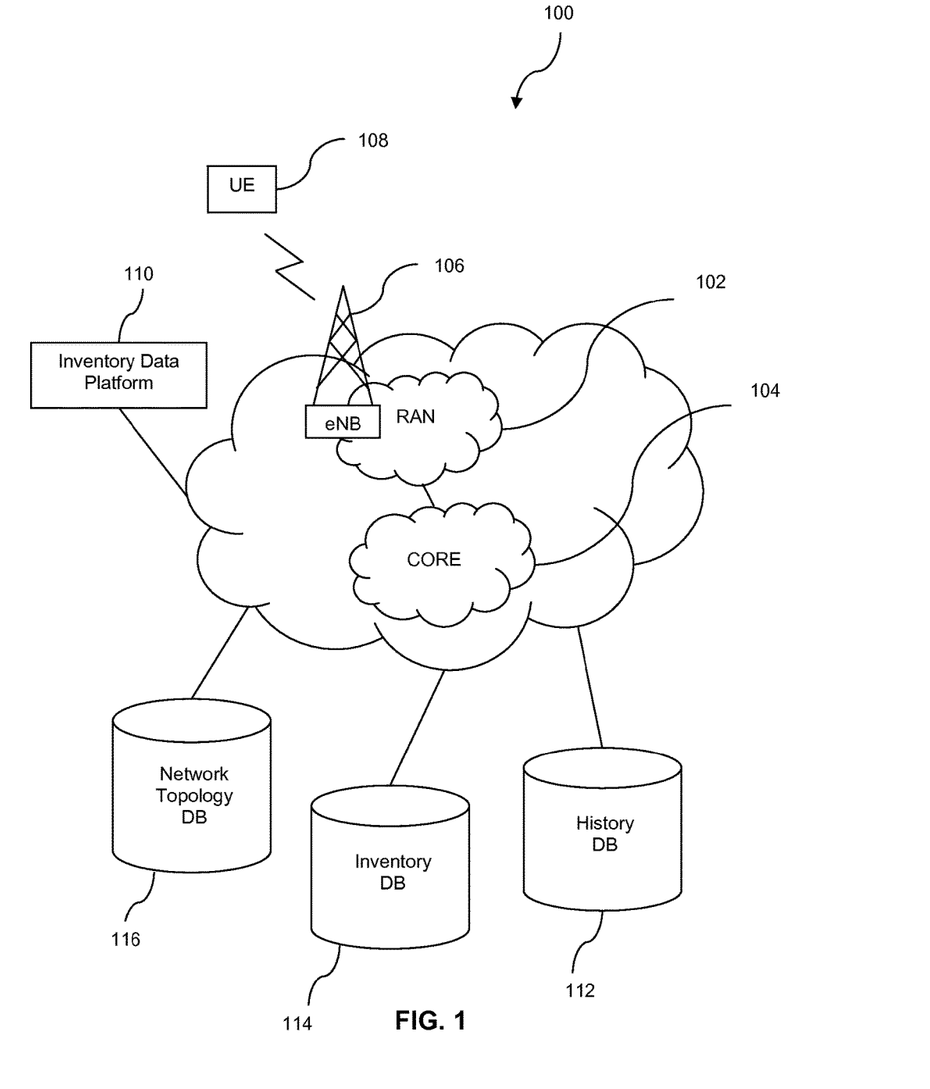
FIG. 1 is an illustration of a wireless communication network according to an embodiment of the disclosure.

Turning now to FIG. 1, a wireless communication network 100 is described. In an embodiment, the network 100 comprises a radio access network (RAN) 102 communicatively coupled to a core network 104. The radio access network 102 comprises a plurality of cell towers 106 or base band units (BBUs). A base band unit may be an enhanced Node B (eNB), a base transceiver station (BTS), or other equipment. A user equipment (UE) 108 may be communicatively coupled with the radio access network 102 through the cell tower 106. The UEs 108 may be mobile telecommunications devices, smart phones, personal digital assistants (PDAs), media players, wearable computers, headset computers, laptop computers, tablet computers, notebook computers, or desktop computers. It is understood that in different embodiments, any number of cell towers 106 may be communicatively coupled to the radio access network 102. Different vendors or original equipment manufacturers may manufacture the different network equipment items of the radio access network 102 and core network 104. The totality of network equipment items may be referred to as network inventory or inventory. An inventory data platform 110 is coupled to the network 100. The network 100 may create a history database 112, an inventory database 114, and a network topology database 116. The history database 112 stores a record of the changes found in the data that have occurred since a previous conversion iteration. The inventory database 114 stores the raw data that was collected previously with a corresponding date stamp in order to calculate a checksum on recently collected raw data. The network topology database 116 stores physical and logical parent-child relationship information among the network equipment items.

Figure 2:
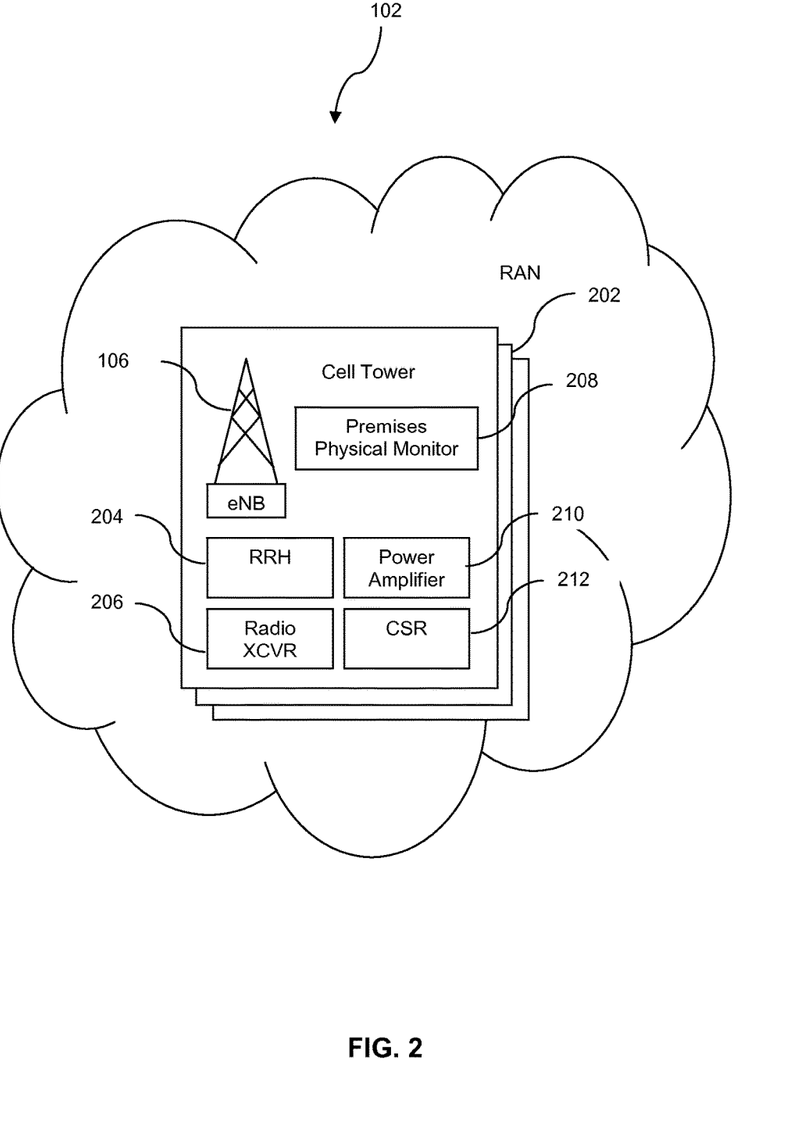
FIG. 2 is an illustration of a radio access network (RAN) according to an embodiment of the disclosure.

Turning now to FIG. 2, the radio access network (RAN) 102 is described. The RAN 102 comprises a cell tower 202. The cell tower 202 may further comprise a base band unit (BBU), a radio receiver head (RRH) 204, a radio transceiver 206, a premises physical monitor 208, a radio power amplifier 210, a cell site router 212, or any combination of three or more of these network equipment items. The BBU may be an enhanced node B, a base transceiver station, or other equipment. The cell tower 202 may alternatively be a small cell or a pico cell which are single pieces of equipment and not a composition of a plurality of separate pieces of equipment. A user equipment (UE) 108 may be communicatively coupled with the radio access network 102 through the cell tower 106. The UEs 108 may be mobile telecommunications devices, smart phones, personal digital assistants (PDAs), media players, wearable computers, headset computers, laptop computers, tablet computers, notebook computers, or desktop computers. The UE 108 may establish a wireless communication link with the radio transceiver 206 and/or the cell tower 106 according to a long term evolution (LTE), a code division multiple access (CDMA), a global system for mobile communications (GSM), worldwide interface for microwave access (WiMAX), or another wireless telecommunication protocol. In some contexts, the cell tower 106 may be referred to as a base transceiver station (BTS).

Figure 3:
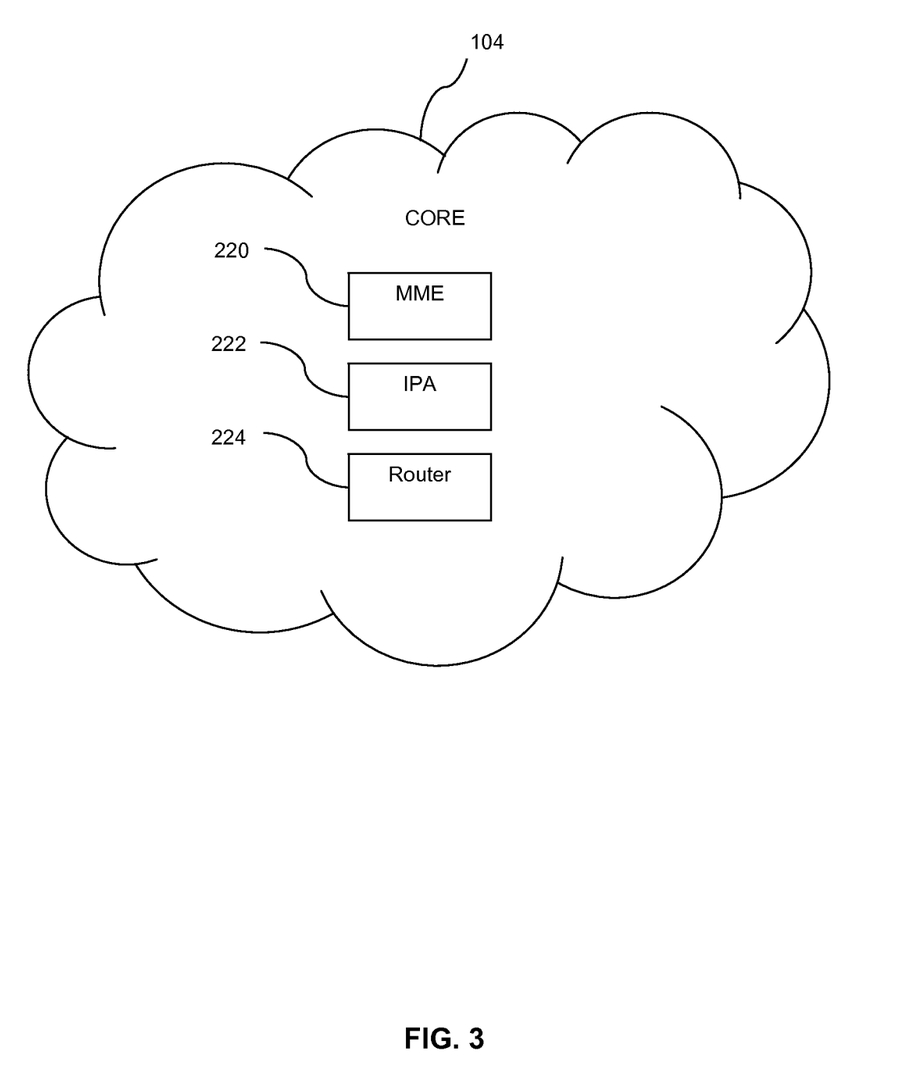
FIG. 3 is an illustration of a core network according to an embodiment of the disclosure.

Turning now to FIG. 3, the core network 104 is described. The core network 104 comprises a mobility management entity (MME) 220, an internet protocol aggregator (IPA) 222, a router 224, or any combination of two or more of these core network equipment items. The core network 104 provides a number of communication services. For example, the core network 104 authenticates UEs 108 that may be attempting to connect to the core network 104 via the radio access network 102, mobility management services, and premium connection services.

Figure 4:
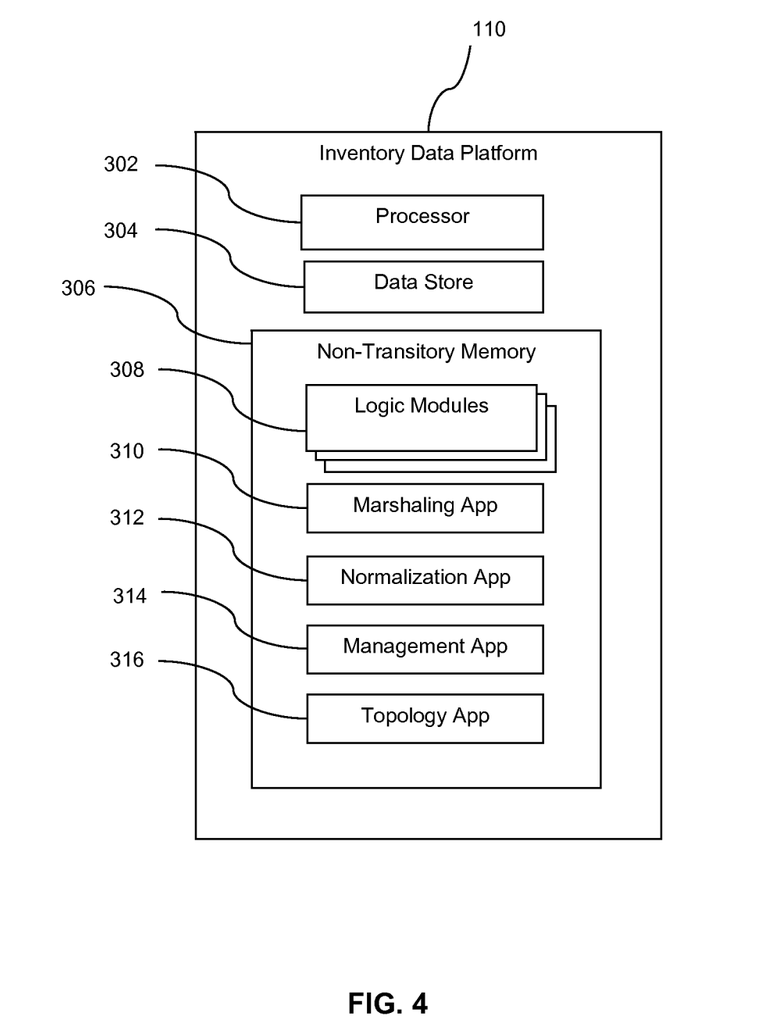
FIG. 4 is a block diagram of an inventory data platform according to an embodiment of the disclosure.

Turning now to FIG. 4, the inventory data platform 110 is described. The platform 110 comprises a processor 302, a data store 304, and a non-transitory memory 306. A plurality of data collection logic modules 308 may be stored in the memory 306. A marshalling application 310, a normalization application 312, a network topology analysis application 316, and a management application 314 may be stored in the memory 306.

When executed by the processor 302, the plurality of logic modules 308 accesses raw data about network equipment items collected by original equipment manufacturer (OEM) element management systems (EMSs) and stores the raw data about network equipment items in the non-transitory memory 306. The raw data about network equipment items may be collected by any number of EMSs, such as three or more EMSs. The plurality of logic modules 308 continuously collects raw data and saves the raw data by date in the non-transitory memory 306. In an embodiment, the raw data collected by the original equipment manufacturer (OEM) element management systems (EMSs) may be stored in at least fifty different files, and these files may be copied by the plurality of logic modules 308. The raw data may be direct file copies, collected by original equipment manufacturer (OEM) element management systems (EMSs). The raw data may be in extensible markup language (XML) format, comma separated values (CSV) format, or any other format. In an embodiment, the raw data may be remote database queries, collected by a local database on the element management system (EMS). For example, the data may use structured query language (SQL) to export query output to an XML formatted file. In another embodiment, the data may be direct element commands run from the element management system to the cell tower 106. The raw output is collected in a file to be processed by the marshalling application 310. It is understood that a number of other techniques may be used for data collection.

When executed by the processor 302, the marshalling application 310 calculates a checksum on portions of the raw data and compares the checksum to a checksum stored in the data store 304 associated with a corresponding portion of normalized data previously stored in the data store 304. The previously stored data could be data from one minute, one hour, one day, one week, or any other time interval in the past. When the checksums match, this means that the current data has not been changed from the data already stored in the data store 304 and hence need not be further processed. The time-date stamp on the corresponding data in the data store 304, however, is updated to the current time to indicate the currency of the subject data. It is noted that this simple step can save considerable processing time, particularly considering that it may not be unusual to find that inventory data for some categories of equipment may be relatively static and unchanging.

The marshalling application 310 then converts the raw data stored in the memory 306, excluding the portion of raw data associated with a matching checksum, into a plurality of data structures. Converting the raw data comprises grooming to remove data content errors, detecting compressed raw data, and uncompressing the compressed raw data. The plurality of data structures may be in extensible markup language (XML) format, comma separated values (CSV) format, or any other type of format.

In an embodiment, the marshalling application 310 may further determine changes that have occurred in the converted data since a previous conversion iteration and store a record of the changes in a transaction history database 112 in the data store. The portion of raw data that is unique to the checksum may be unique in a number of ways. For example, the data structure could be different from previously stored data in that the serial number of the element has never been seen before. For another example, a different serial number may exist in a corresponding location of the previous data structure. For example, the element could also be unique by its location in the data structure. The element may contain the same serial number, but may be in a different location compared to the previously loaded data structure. In another example, two files may contain the same content, but have different file names. The marshalling application 310 must determine if the file has been previously saved in the inventory database 114. If the file has been found, the marshalling application 310 would change the data stamp of the file already saved in the inventory database 114.

When executed by the processor 302, the normalization application 312 transcodes the data converted by the marshalling application 310 from a plurality of OEM formats to a common format and stores the transcoded data as an inventory database 114 in the data store 304. Each data structure is converted to a normalized database table. A normalization routine runs through all the values in the files and builds a common database table with the same data structure that may contain rows from multiple source tables, as well as specific fields from other source tables.

When executed by the processor 302, the topology application 316 analyzes the data converted by the marshalling application 310 to determine physical parent-child relationships and logical parent-child relationships among the network equipment items and stores physical and logical topology relationship information in a network topology database. The topology application 316 may also analyze the normalized data from the normalization application 312. The parent-child relationship may exist between one node and another node. For example, the topology application 316 matches a first IP address of the mobility management entity (MME) 220 configured in a cell tower 106 to an MME 220 having the first IP address and matching a second IP address of a cell tower 106 configured in the MME 220. Then the topology application 316 inserts a row in the database table with the cell tower 106 as the child and the MME 220 as the corresponding parent. In another example, the topology application 316 determines IP subnets configured on a cell site router (CSR) 212, matches the IP subnets to IP addresses within those subnets on a cell tower 106. Then, the topology application 316 inserts a row in the database table with the cell tower 106 as the child and the cell site router 212 as the corresponding parent. In another example, the topology application 316 may find the IP subnets configured on a cell site router 212 and IP aggregator (IPA) 222 and insert a row in the database table with the cell site router 212 as the child and the IP aggregator 222 as the corresponding parent. The parent-child relationship may also exist within a node, mapping services to elements, or any other combination of possibilities. Examining both physical parent-child and logical parent-child relationships allows the topology application 316 to cross-check the validity of the relationship. For example, two or more network elements may be connected to an interface such as an External Alarm Interface Unit (EAIU) or any other type of interface. The two or more network elements may all determine the serial number of the interface. Therefore, if two or more network elements have the same serial number, this indicates that they may be within the same group in the same geographical location.

The topology database tables created by topology application 316 may be useful in many ways such as determining all the equipment present at a single site, determining common elements with 3G and 4G wireless communication technologies, and finding impeded services due to a fault of an element. When executed by the processor 302, the NOC management application 314 presents a network management view of network equipment based on the network topology database 116.

Figure 5:
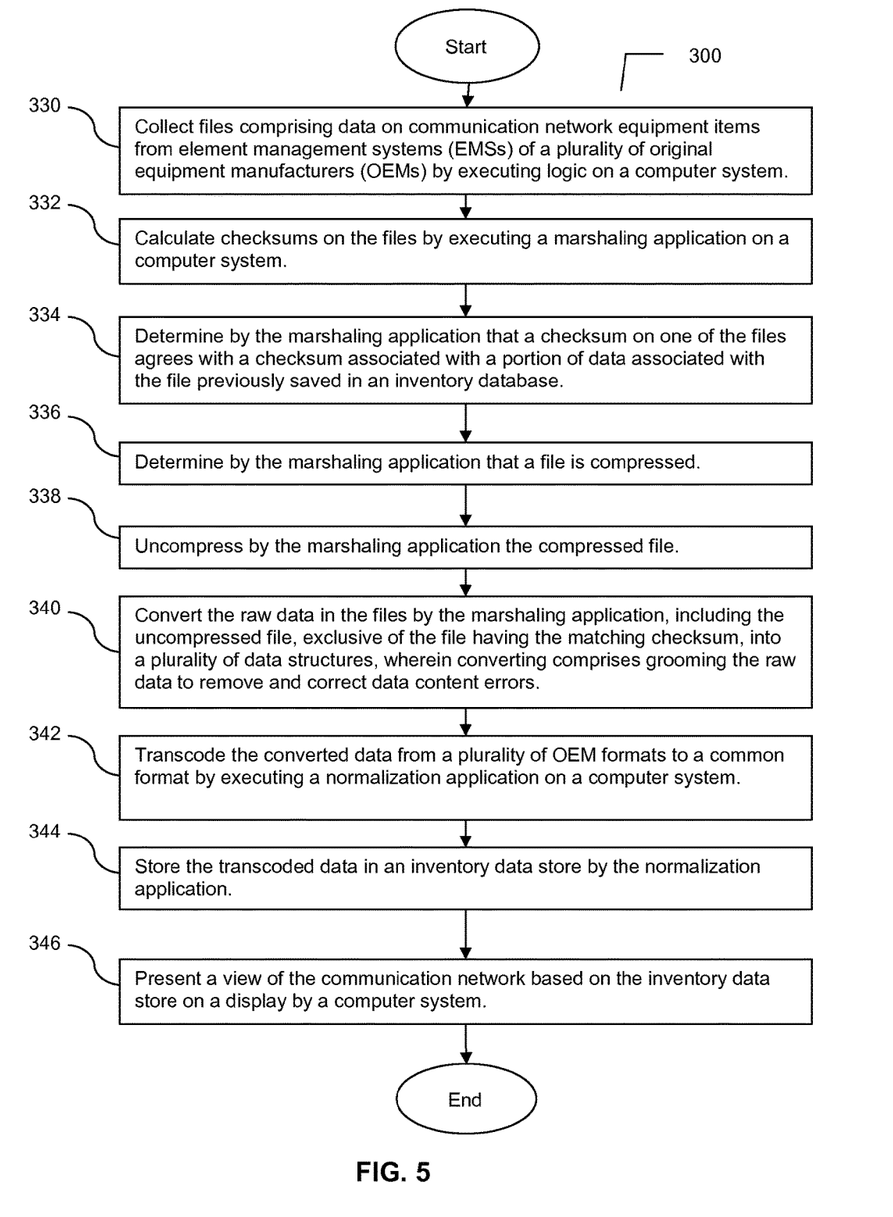
FIG. 5 is a flow chart illustrating a method according to an embodiment of the disclosure.

Turning now to FIG. 5, a method 300 is described. At block 330, files comprising data on communication network equipment items from a plurality of original equipment manufacturers (OEMs) element management systems (EMSs) are collected. The data on communication network equipment items may comprise information on radio frequencies used by individual cell towers. These files are collected by executing logic on a computer system. In some cases, a different logic module 308 may collect each different file. Files may be collected according to many procedures. For example, files comprising data may be collected by copying files from a file on an element management system (EMS). For example, files comprising data may be collected by remotely accessing a database local to an element management system (EMS) and copying the data back to a file in the computer system which executes the collection logic modules 308. For example, files comprising data may be collected by a logic module 308 remotely executing commands on the network element item. The plurality of logic modules 308 continuously collects raw data throughout the day and saves the raw data by date in the non-transitory memory 306. A plurality of the files may comprise data formatted in extensible markup language (XML) format, and a plurality of the files may be in comma separated value (CSV) format.

At block 332, a marshalling application executed on a computer system calculates checksums on the files. At block 334, the marshalling application determines that a checksum on one of the files agrees with a checksum associated with a portion of data associated with the file previously saved in an inventory database 114. The marshalling application 310 may update the date stamp of the data associated with the file having the matching checksum in the inventory database 114. The data associated with the file having the matching checksum will not be processed further, thereby saving the effort of performing further processing.

At block 336, the marshalling application determines if the file is compressed. At block 338, the marshalling application uncompresses the compressed file detected at block 336. For example, larger files need to be compressed each time the routine is run while smaller files sometimes may not need to be compressed at all.

At block 340, the marshalling application converts the raw data in the files into a plurality of data structures, wherein converting the data comprises grooming the raw data to remove and correct data content errors. The raw data includes the uncompressed file, exclusive of the file having the matching checksum.

At block 342, a normalization application that has been executed on a computer system transcodes the converted data from a plurality of OEM formats to a common format. At block 344, the normalization application stores the transcoded data in an inventory database 114 in the data store 304. The transcoded data is converted to a normalized database table. A normalization routine runs through all the values in the files and builds a common database table with the same data structure that may contain rows from multiple source tables, as well as specific fields from other source tables. At block 346, a display by a computer system presents a view of the communication network based on the inventory data store.

Figure 6:
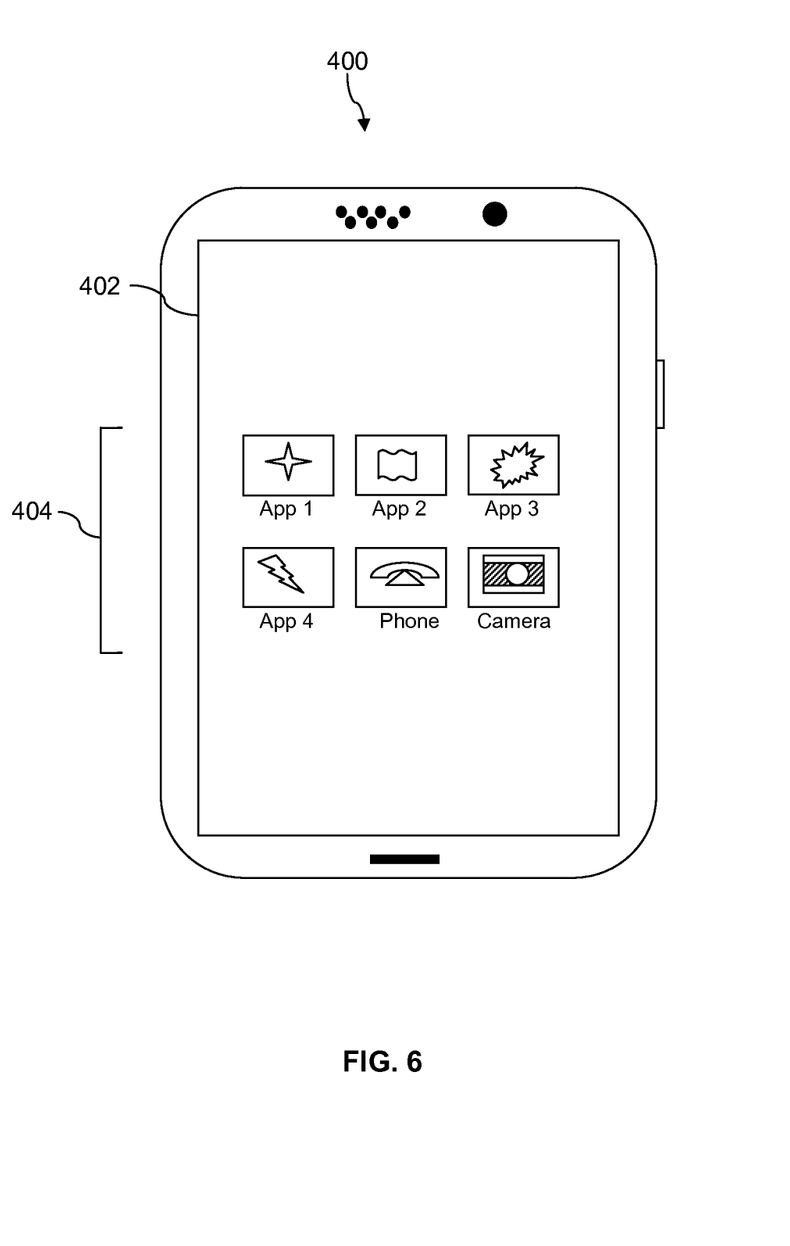
FIG. 6 is an illustration of a user equipment (UE) according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
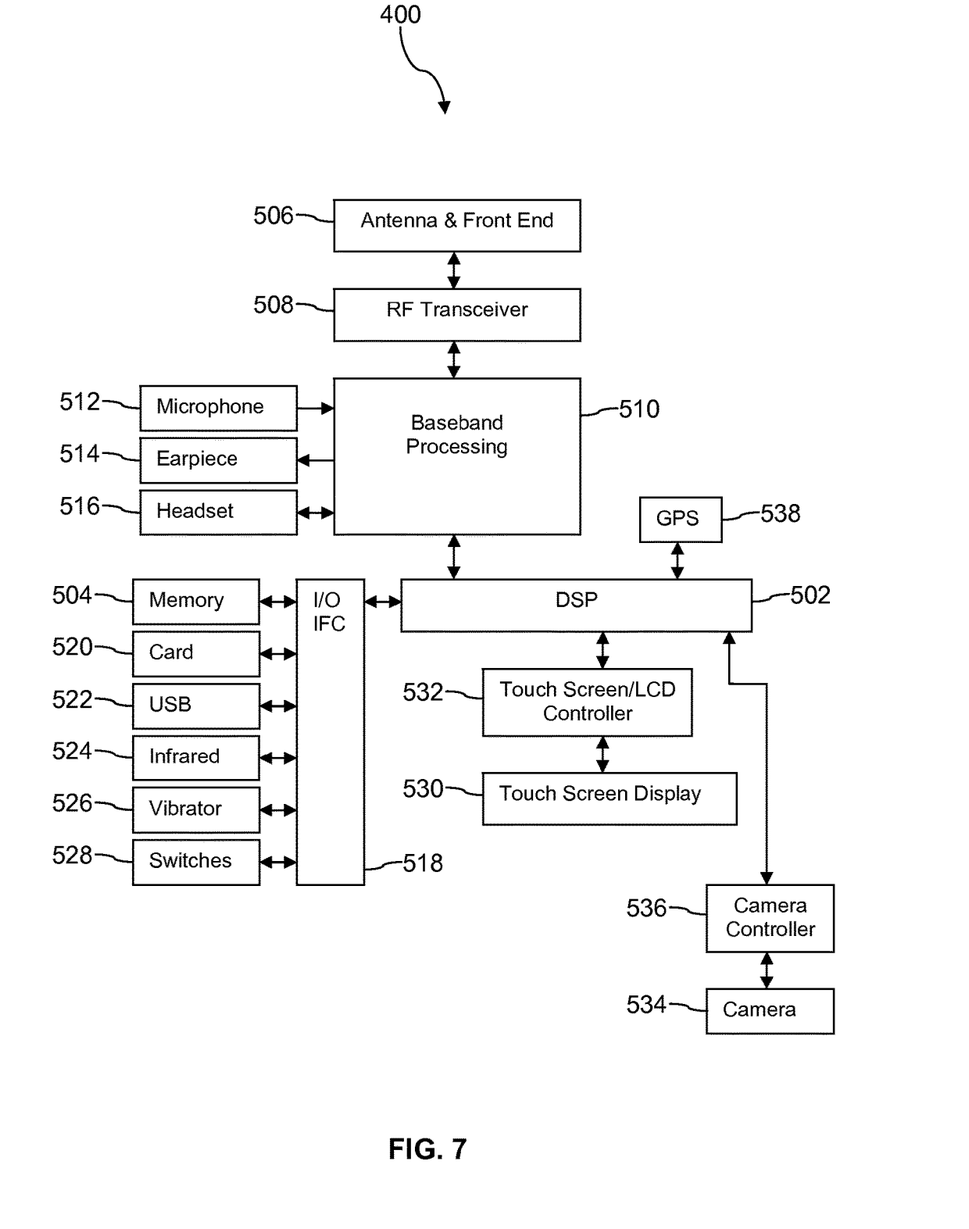
FIG. 7 is a block diagram of a user equipment (UE) according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
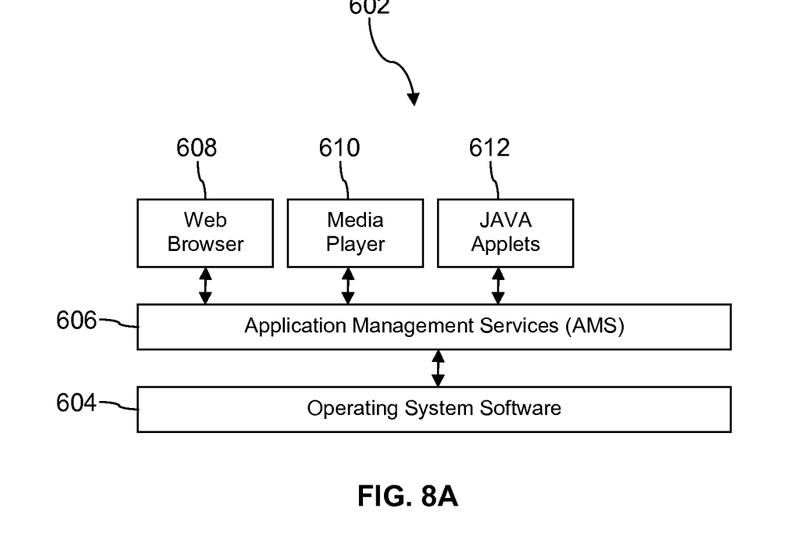
FIG. 8A is a block diagram of a software architecture of a user equipment (UE) according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
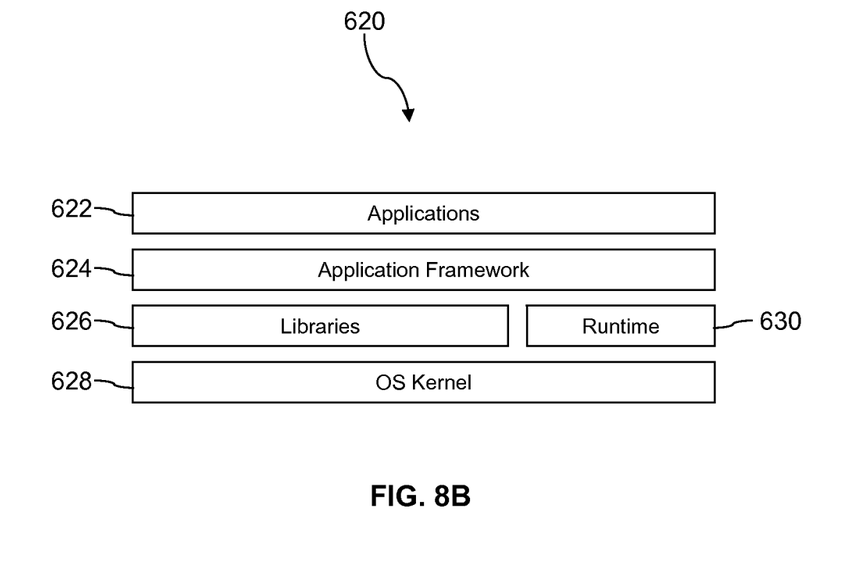
FIG. 8B is a block diagram of another software architecture of a computer system according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
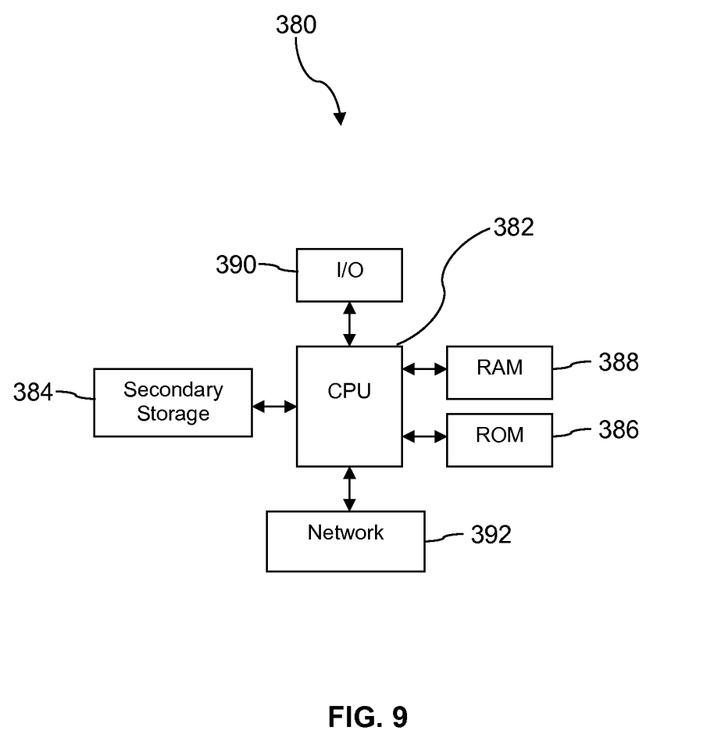
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication network operation center network equipment inventory data platform, comprising:
    at least one processor;
    a non-transitory memory;
    a data store;
    a plurality of data collection logic modules stored in the non-transitory memory that, when executed by the processor, accesses raw data about network equipment items collected by original equipment manufacturer (OEM) element management systems (EMSs) and stores the raw data about network equipment items in the non-transitory memory;
    a marshalling application stored in the non-transitory memory that, when executed by the processor, calculates a checksum on portions of the raw data about network equipment items and compares the checksum to a checksum stored in the data store associated with a corresponding portion of normalized data previously stored in the data store, when the checksums match updates the date stamp associated with the corresponding portion of normalized data previously stored in the data store, converts the raw data about network equipment items stored in the non-transitory memory, excluding the portion of raw data associated with a matching checksum, into a plurality of data structures, wherein converting the raw data comprises grooming the raw data to remove data content errors, detecting compressed raw data, and uncompressing the compressed raw data;
    a normalization application stored in the non-transitory memory that, when executed by the processor, transcodes the data converted by the marshalling application from a plurality of OEM formats to a common format and stores the transcoded data in the data store as an inventory database;
    a network topology analysis application stored in the non-transitory memory that, when executed by the processor, analyzes the converted data about network equipment items to determine physical parent-child relationships and logical parent-child relationships among the network equipment items and stores physical and logical topology relationship information in a network topology database; and
    a network operations center (NOC) management application stored in the non-transitory memory that, when executed by the processor, presents a network management view of network equipment based on the inventory database and presents a network management view of network equipment based on the network topology database.

2. The platform of claim 1, wherein the raw data about network equipment items is collected by at least three different EMSs.

3. The platform of claim 1, wherein the network equipment items comprise radio access network (RAN) equipment comprising at least three of a base band unit (BBU), an enhanced node B (eNB), a base transceiver station (BTS), a remote radio head (RRH), a radio transceiver, a radio power amplifier, and a cell site router (CSR).

4. The platform of claim 3, wherein the network equipment items further comprise core network equipment comprising at least two of a mobility management entity (MME), a router, and an internet protocol aggregator (IPA).

5. The platform of claim 1, wherein the marshalling application further determines changes that have occurred in the converted data since a previous conversion iteration and stores a record of the changes in a transaction history database in the data store.

6. The platform of claim 1, wherein the raw data collected by the OEM EMSs are stored in at least 50 different files and the data collection logic modules copy those files.

7. A method of managing a communication network from a network operation center (NOC) management application, comprising:
    collecting files comprising data on communication network equipment items from element management systems (EMSs) of a plurality of original equipment manufacturers (OEMs) of the network equipment items, where the files are collected by logic executing on a computer system;
    calculating checksums on the files, by a marshalling application, executing on a computer system;
    determining, by the marshalling application, that a checksum on one of the files agrees with a checksum associated with a portion of data associated with the file previously saved in an inventory database;
    determining, by the marshalling application, that a file is compressed;
    uncompressing, by the marshalling application, the compressed file;
    converting the raw data in the files by the marshalling application, including the uncompressed file, exclusive of the file having the matching checksum, into a plurality of data structures, wherein converting comprises determining grooming the raw data to remove and correct data content errors;

transcoding the converted data from a plurality of OEM formats to a common format, by a normalization application, executing on a computer system;

storing, by the normalization application, the transcoded data in an inventory data store;

presenting a view of the communication network based on the inventory data store on a display by a computer system;

analyzing, by a network topology analysis application, the converted data about network equipment items to determine physical parent-child relationships and logical parent-child relationships among the network equipment items;

storing, by the network topology analysis application, physical and logical topology relationship information in a network topology database; and presenting a view of the communication network based on the network topology database on the display by the computer system.

8. The method of claim 7, wherein a different logic module collects each different file.

9. The method of claim 7, further comprising updating a date stamp of the data associated with the file having the matching checksum in the inventory data store.

10. The method of claim 7, wherein the data on communication network equipment items comprises information on radio frequencies actually used by individual cell towers.

11. The method of claim 7, wherein a plurality of the files comprise data formatted in extensible markup language (XML) format and a plurality of the files are in comma separated value (CSV) format.

12. The method of claim 7, wherein collecting files comprising data comprises copying files from a file on an EMS.

13. The method of claim 7, wherein collecting files comprising data comprises remotely accessing a database local to an EMS and copying the data back to a file in the computer system on which the collection logic modules execute.

14. The method of claim 7, wherein collecting files comprising data comprises executing commands by a logic module on the network element item remotely.

15. A communication network operation center network equipment inventory data platform, comprising:

at least one processor;

a non-transitory memory;

a data store;

a plurality of data collection logic modules stored in the non-transitory memory that, when executed by the processor, accesses raw data about network equipment items collected by original equipment manufacturer (OEM) element management systems (EMSs) and stores the raw data about network equipment items in the non-transitory memory;

a marshalling application stored in the non-transitory memory that, when executed by the processor, calculates a checksum on portions of the raw data about network equipment items and compares the checksum to a checksum stored in the data store associated with a corresponding portion of normalized data previously stored in the data store, when the checksums match updates the date stamp associated with the corresponding portion of normalized data previously stored in the data store, converts the raw data about network equipment items stored in the non-transitory memory, excluding the portion of raw data associated with a matching checksum, into a plurality of data structures, wherein converting the raw data comprises grooming the raw data to remove data content errors, detecting compressed raw data, and uncompressing the compressed raw data;

a network topology analysis application stored in the non-transitory memory that, when executed by the processor, analyzes the converted data about network equipment items to determine physical parent-child relationships and logical parent-child relationships among the network equipment items and stores physical and logical topology relationship information in a network topology database; and a network operations center (NOC) management application stored in the non-transitory memory that, when executed by the processor, presents a network management view of network equipment based on the network topology database.

16. The platform of claim 15, wherein some of the logical parent-child relationships are determined by the network topology analysis application by matching a first IP address of a mobility management entity (MME) configured in an enhanced node B to an MME having the first IP address and matching a second IP address of an enhanced node B configured in the MME.

17. The platform of claim 15, wherein the network topology analysis application determines IP subnets configured on a cell site router, matches the IP addresses on a BTS and enhanced node B that are within those subnets, and establishes the BTS and enhanced node B as a child and the cell site router as the corresponding parent.

18. The platform of claim 15, wherein the network topology analysis application finds IP subnets configured on a cell site router and an IP aggregator (IPA) and establishes the cell site router as the child and the IPA as the parent.

19. The platform of claim 15, further comprising a normalization application stored in the non-transitory memory that, when executed by the processor, transcodes the data converted by the marshalling application from a plurality of OEM formats to a common format and stores the transcoded data in the data store as an inventory database.

* * * * *